US006444331B2

(12) United States Patent
Ritter et al.

(10) Patent No.: US 6,444,331 B2
(45) Date of Patent: Sep. 3, 2002

(54) ROUGHENED BOND COATS FOR A THERMAL BARRIER COATING SYSTEM AND METHOD FOR PRODUCING

(75) Inventors: Ann Melinda Ritter; Melvin Robert Jackson, both of Niskayuna; Curtis Alan Johnson, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/872,272

(22) Filed: Jun. 4, 2001

Related U.S. Application Data

(62) Division of application No. 09/199,065, filed on Nov. 24, 1998, now Pat. No. 6,264,766.

(51) Int. Cl.[7] .................. B32B 15/14; B32B 15/20; C23C 24/00
(52) U.S. Cl. ............ 428/553; 428/608; 428/609; 428/937
(58) Field of Search ............... 428/553, 608, 428/609, 937

(56) References Cited

U.S. PATENT DOCUMENTS

| | | | |
|---|---|---|---|
| 4,273,824 A | 6/1981 | McComas et al. | |
| 4,617,056 A | 10/1986 | Mosser et al. | |
| 5,235,745 A | 8/1993 | Gupta et al. | |
| 5,403,669 A | 4/1995 | Gupta et al. | |
| 5,531,955 A | 7/1996 | Sugikawa | |
| 5,939,172 A | 8/1999 | Snakenborg et al. | |
| 6,136,453 A | * | 10/2000 | Ritter et al. |
| 6,241,469 B1 | * | 6/2001 | Beeck et al. |

OTHER PUBLICATIONS

Merriam Webster's Collegiate Disctionary, Tenth Addition 1997, p. 728–729. No Month.*

* cited by examiner

Primary Examiner—Deborah Jones
Assistant Examiner—Jason Savage
(74) Attorney, Agent, or Firm—Noreen C. Johnson; Christian G. Cabou (57) ABSTRACT

A roughened bond coat comprises a screen that includes interwoven wires defining openings and a metallic material disposed on the screen. The screen and metallic material form a roughened bond coat possessing an uneven, undulated, and irregular surface. The metallic material may be one of a slurry and a powder, and applied by coating and spraying, respectively. A thermal barrier coating system, which is formed with and incorporates the roughened bond coat, exhibits greater adhesion of a thermal barrier coating and bond coat due to an increased interfacial surface area provided by the uneven, undulated, and irregular surface.

32 Claims, 5 Drawing Sheets fig. 1
PRIOR ART fig. 2

ROUGHENED BOND COATS FOR A THERMAL BARRIER COATING SYSTEM AND METHOD FOR PRODUCING

This application is a division of application Ser. No. 09/199,065, filed Nov. 24, 1998 now U.S. Pat. No. 6,264, 766 which is hereby incorporated by reference in its entirety.

BACKGROUND OF THE INVENTION

The invention relates to bond coats. In particular, the invention relates to roughened bond coats for thermal barrier coating systems.

Thermal barrier coating systems are used in hot-section components in turbines, for example jet engine and gas turbines. The thermal barrier coating system insulates the turbines from high temperatures during thermal cycling. Thermal barrier coating systems include a thermal barrier coating (TBC) disposed on a bond coat, which in turn is disposed on a substrate. The thermal barrier coating normally comprises zirconia, such as example at least one of a stabilized zirconia and a partially-stabilized zirconia (PSZ). The bond coat typically comprises an oxidation-resistant metallic layer disposed between the TBC and substrate turbine component. The TBC is adhered to the bond coat typically by mechanical interlocking, so the bond coat provides oxidation resistant to the substrate and a relatively rough surface. The bond coat surface generally has Ra (Arithmetic Average Roughness (Ra) as determined from ANSI/ASME Standard B461-1985) values over about 350 mainly by mechanical interlocking. So the function of the bond coat is to provide oxidation resistant to the substrate and a relatively rough surface, preferably with Ra values over about 350 microinches, for the TBC to adhere to the substrate. Thus, the TBC is disposed over the turbine component can provide thermal insulation.

Figure 1:
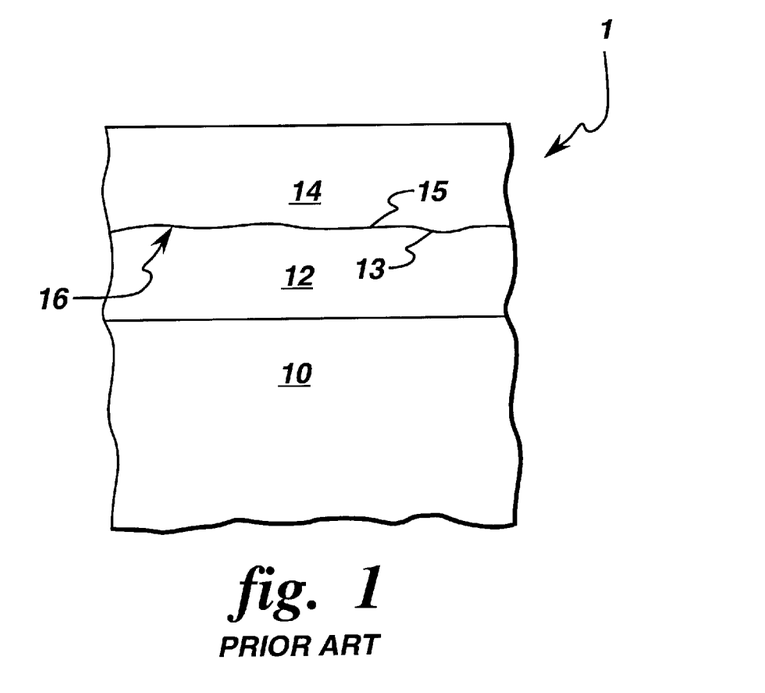
FIG. 1 is a schematic representation of a known thermal barrier coating system.

FIG. 1 is a schematic representation of a known thermal barrier coating system 1. A substrate 10 comprises an underlying part of a component, for example a turbine component. A bond coat 12 is disposed on the substrate 10. The bond coat is disposed on the substrate 10 by any appropriate method, for example, but not limited to, thermal spray processes, such as vacuum plasma spray (VPS), air plasma spray (APS) and hyper-velocity oxy-fuel (HVOF) spray processes.

The structure and roughness of bond coat surface 13 are dependent on the spray process. Bond coats deposited by a VPS process are typically dense and free of oxides. Therefore, VPS-applied bond coats provide protection at high temperatures against oxidation. The VPS application process disposes fine powders, and thus, VPS-applied bond coats are typically dense, for example having a density greater than about 90% of its theoretical density, but have relatively smooth surfaces. Consequently, a TBC does not adhere well to a VPS bond coat.

An air plasma spray (APS) process produces rough bond coats because of large powders used in APS. The large powders possess a relatively high heat capacity; however, the APS-applied bond coats contain high amounts of oxides. Also, APS-applied bond coats possess a relatively low porosity due to the oxidation environment and low momentum of the powders. Although APS-applied bond coats provide better TBC adhesion due to their roughness, they are more prone to oxidation because of their relatively high oxide levels and relatively low porosity.

Bond coats deposited by HVOF are sensitive to particle size distributions. Dense and oxide-free bond coats can be deposited by HVOF using very lean conditions (low oxygen amounts) and finer particles, for example particles with a size about −325+10 μm. The surface roughness of HVOF-applied bond coats is relatively smooth. Rough bond coats can be deposited by HVOF using coarser powders, for example particles with a size about −230+325, however a low HVOF flame temperature is needed. The low flame temperatures result in the bond coat comprising un-melted powders, therefore the coating is porous and less dense.

A TBC 14 is disposed on the bond coat 12 and forms surface 15 against the surface 13. The TBC 14 is disposed on the bond coat 12 by any appropriate process to adhere (bond) to the bond coat. The TBC surface 15 and bond coat surface 13 define an interfacial area 16 at their adjoining surfaces.

Effectiveness of a thermal barrier coating system during thermal cycling is compromised by de-bonding of the TBC and bond coat, for example at the TBC and bond coat interfacial area. De-bonding can be caused by at least one of a poor TBC and bond coat adhesion, and lack of accommodation of thermal expansion mismatch between the TBC and bond coat. The lack of adhesion is characteristic of smooth adjoining surfaces where a total surface area is minimal. The thermal expansion mismatch between the TBC and bond coat results from different coefficients of thermal expansion of the materials used for these features. If the difference in coefficients of thermal expansion of the adhered elements is large, one element expands much more than the other, and separation and de-bonding occur at the interfacial areas. De-bonding of the TBC and bond coat is undesirable as the insulation effect of the thermal barrier coating system will be lost at TBC separation.

Therefore, it is desirable to increase adhesion between the TBC and the bond coat to prevent de-bonding. The adhesion between the bond coat and TBC can be increased by roughening a bond coat, thus increasing an area at an interfacial area mating surface of adhered elements and enhancing mechanical interlocking adhesion between the bond coat and TBC. Increasing a bond coat's roughness provides an enhanced interfacial surface area for accommodation of any thermal mismatch, with respect to non-roughened bond coats.

SUMMARY OF THE INVENTION

The invention overcomes the above noted deficiencies of known thermal barrier coating systems. The invention sets forth a method of forming a bond coat that comprises providing a screen, where the screen comprises interwoven wires defining openings; providing a metal material; and disposing the metal material onto the screen to form an uneven, undulated, and irregular surface.

The invention also sets forth a method of forming a roughened bond coat that comprises providing a screen, where the screen comprises interwoven wires defining openings; providing a powder; and plasma spraying the powder on the screen to form an uneven, undulated, and irregular surface.

The invention also sets forth a further method of forming a roughened bond coat that comprises providing a screen, where the screen comprises interwoven wires defining openings; providing a slurry; and disposing the slurry on the screen to form an uneven, undulated, and irregular surface.

A roughened bond coat is set forth embodied by the invention, and comprises a screen, where the screen includes interwoven wires defining openings; and a metal material disposed on the screen. The metal material on the screen forms an uneven, undulated, and irregular surface.

An embodiment of the invention provides a method of forming a thermal barrier coating system, where the thermal barrier coating system comprises a roughened bond coat disposed on a substrate and a thermal barrier coating disposed on the bond coat. The method comprises disposing a roughened bond coat on the substrate and disposing a thermal barrier coating on the roughened bond coat. The roughened bond coat comprises a screen having interwoven wires defining openings and a metal material disposed on the screen to form the roughened bond coat. The roughened bond coat possessing an uneven undulated surface adjacent to the thermal barrier coating.

A further embodiment of the invention provides a thermal barrier coating system. The thermal barrier coating system comprises a roughened bond coat and a thermal barrier coating disposed on a substrate. The roughened bond coat comprises a screen with interwoven wires defining openings and a metal material disposed on the screen to form a roughened bond coat. The roughened bond coat possessing an uneven undulated surface adjacent to the thermal barrier coating.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

Roughened bond coats enhance adhesion between a thermal barrier coating (TBC) and a bond coat in a thermal barrier coating system. Roughened bond coats prevent de-bonding and separation between the TBC and bond coat of the thermal barrier coating system. A roughened bond coat increases interfacial mating surface areas of adhered elements, enhances mechanical interlocking between the bond coat and TBC, and provides for accommodation of thermal mismatches between the TBC and bond coat. Accordingly, expansion of elements in a thermal barrier coating system with a roughened bond coat does not lend to separation and de-bonding therebetween. An effect of the roughened bond coat includes an enhanced life of the TBC in the thermal barrier coating system.

In the following description, material compositions of mixtures are provided in approximate weight percent unless otherwise expressed. Further, individual compositions are provided in weight percent, unless otherwise provided. For example, if a mixture comprises about 70% of Constituent A and about 30% of constituent B, the percents are in weight percents. Nomenclature used for compositions is as follows. If Composition A comprises Ni-23Cr-6Al-0.4Y, yttrium is provided at 0.4 weight percent, aluminum is provided at 6 weight percent, chromium is provided at 23 weight percent, and nickel is provided as the balance weight percent.

Figure 2:
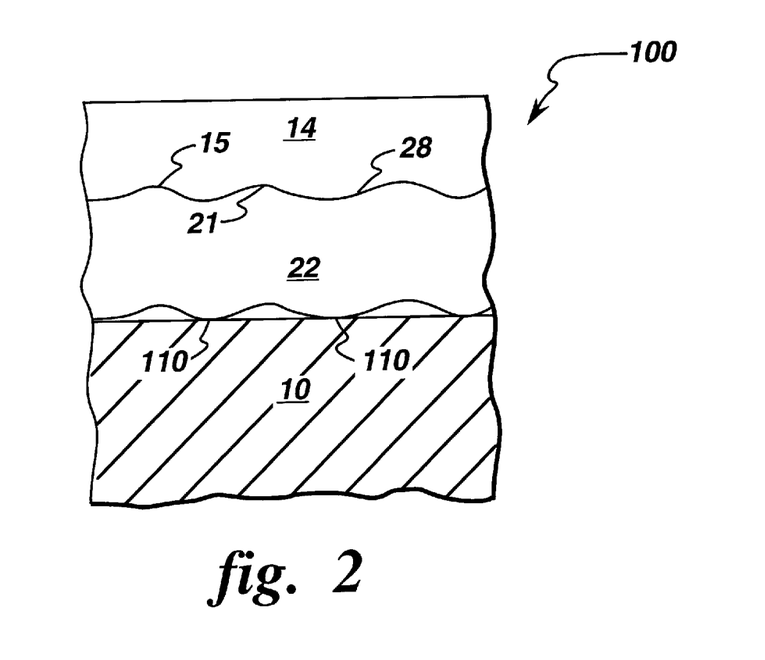
FIG. 2 is a schematic representation of a thermal barrier coating system including a roughened bond coat.

A thermal barrier coating system 100 including a roughened bond coat, as embodied by the invention, is schematically illustrated in FIG. 2. The thermal barrier coating system 100 comprises a substrate 10, a roughened bond coat 22 and a TBC 14. An interfacial surface area 28 is located at adjacent, adjoining surfaces 21 and 15 of the roughened bond coat 22 and the TBC 14, respectively. The roughened bond coat 22 is attached to the substrate 10, by at least one connection 110. The connection 110 comprises a physical attachment, for example a weld, such as at least one of a tack weld, laser weld, and ultrasonic weld. The number of connections varies dependent on factors such as, but not limited to, a screen's wire and mesh opening sizes.

A thermal barier coating system 100 including a roughened bond coat, as embodied by the invention, is schematically illustrated in FIG. 2. The thermal barrier coating system 100 comprises a substrate 10, a roughened bond coat 22 and a TBC 14. An interfacial surface area 28 is located at adjacent, adjoining surfaces 21 and 15 of the roughened bond coat 22 and the TBC 14, respectively. The roughened bond coat 22 is attached to the substrate 10, by at least one connection 110. The connection 110 comprises a physical attachment, for example a weld, such as at least one of a tack weld, laser weld, and ultrasonic weld. The number of connections varies dependent on factors such as, but not limited to, a screen's wire and mesh opening sizes.

Figure 3:
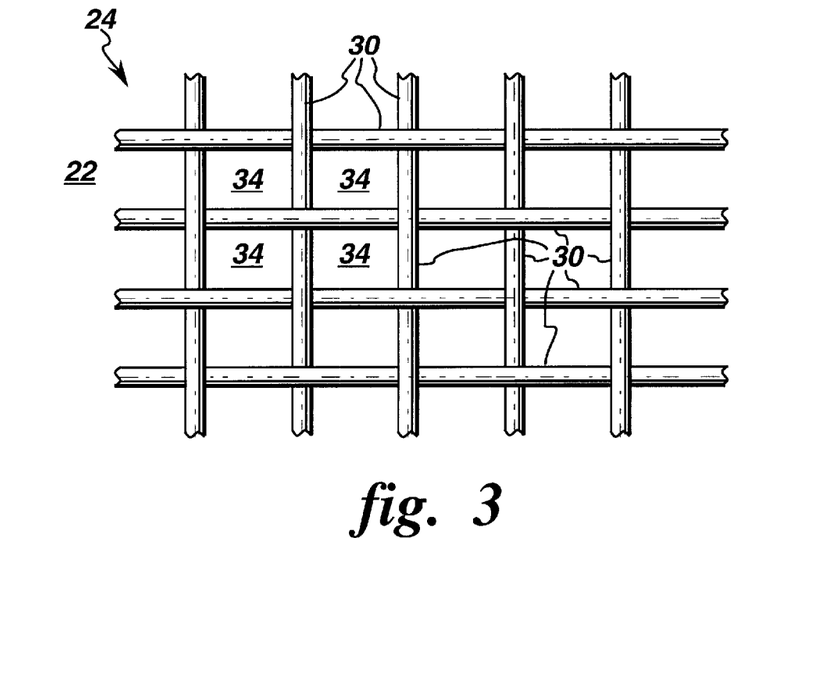
FIG. 3 is a plan illustration of a screen for use in a roughened bond coat.

The roughened bond coat 22 comprises a screen 24 provided with a metallic material 26 disposed thereon. FIG. 3 illustrates a screen 24, such as a metal screen, used to form a roughened bond coat 22. The metal screen 24 comprises a material that is metallurgically similar to the material of the substrate 12. For example, if the substrate is a turbine formed of a nickel-based superalloy composition, the screen 24 is formed from a nickel-based material. This material is merely exemplary of screen materials, and is not meant to limit the scope of the invention.

The screen 24 comprises interwoven wires 30 that define mesh openings 34. The size of the wires 30 and openings 34 varies, dependent on the ultimate desired roughness of the bond coat 22. For example, the wires 30 of the screen 24 are provided with an average diameter in a range between about 5 $\mu$m to about 240 $\mu$m. The openings 34 of the screen 24 are substantially rectangular, such as square openings. The size of the openings 34 are provided in a range from about 190 $\mu m^2$ to about 420 $\mu m^2$. For example and in no way limiting of the invention, a "fine" screen 24 provides an opening of about 200 $\mu m^2$ with about 50 $\mu$m average diameter wire; a "medium" screen 24 provides an opening 34 of about 190 $\mu m^2$ with about 130 $\mu$m average diameter wire; and a "coarse" screen 24 provides an opening of about 420 $\mu m^2$ with about 240 $\mu$m average diameter wire.

Figure 4:
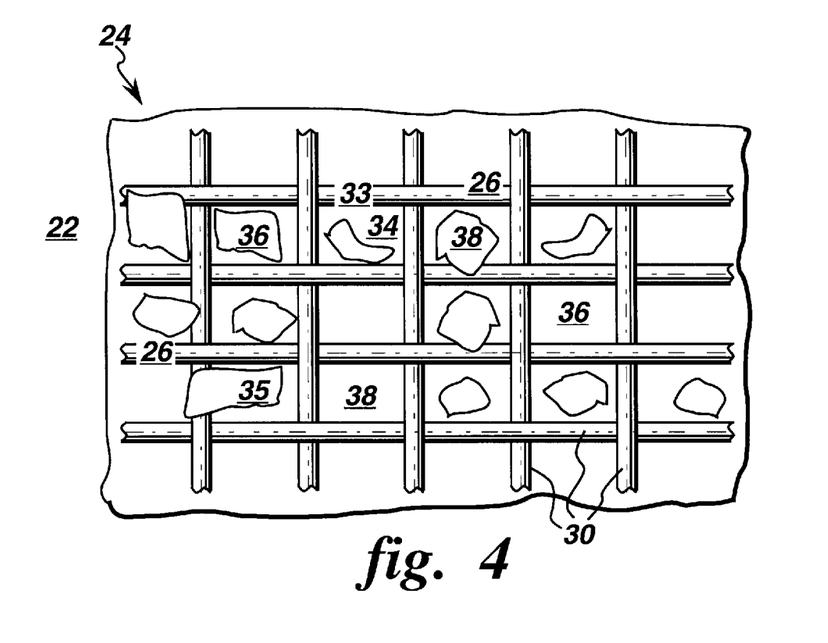
FIG. 4 is a plan illustration of a roughened bond coat.

FIG. 4 is a schematic illustration of a roughened bond coat 22 with a metallic material 26 disposed on wires 30 of screen 24. The metallic material 26 is disposed on the screen 24 by a method appropriate for the metallic material 26. These methods include, but are not limited to; spraying, such as, but not limited to, plasma spraying; coating, such as by directly applying (painting); and deposition, such as chemical vapor deposition and physical vapor deposition. FIG. 4 illustrates one possible configuration of the metallic material 26 on the wires 30 and in the openings 34 of the screen 22, however this is merely exemplary and not meant to limit the invention. An exact configuration of the metallic material 26 on the screen 22 is dependent on various factors, including, but not limited to, process variables used in applying the metal material 26, the size of the wires 30 and openings 34, and material characteristics of the metal material 26, such as density and viscosity.

The metallic material 26 covers portions of the wires 30 and extends into and at least partially fills the openings 34, as illustrated in FIG. 4. For example, and in no way limiting of the invention, the metallic material 26 totally covers the wires 30, as at portion 33. The metallic material 26 also partially covers the wires 30, as at portion 35. Further, the metallic material 26 totally covers the wires 30, while exposing other parts of the wires 30. The metallic material 26 completely fills openings 34 in the screen 22, as at portion 36. The metallic material 26 also at least partially fills the openings 34, as at portion 37. Further, the metallic material 26 completely fills some of the openings 34, and partially fills other openings 34, as at portion 38. In other words, the metallic material 26 covers at least part of wires 30 and fills parts of the openings 34.

The metallic material 26 possesses a thermal expansion coefficient that is close to the thermal expansion coefficient of the TBC 14. Close thermal expansions for the metallic material 26 and TBC 14 avoid one of these expanding much more than the other, thus avoiding de-bonding.

The metallic material 26 is also an oxidation resistant material. Oxidation of the thermal barrier coating system is undesirable since it causes spalling, separation, de-bonding, and possible failure of the thermal barrier coating system, and oxidation is reduced by the addition of the metallic material 26. The metallic material 26 comprises at least one oxidation resistant material selected from MCrAlY, where M is at least one of nickel (Ni), iron (Fe), and cobalt (Co), AlSi (hereinafter "AlSi"), and Ni-60Al-1B. The invention describes MCrAlY as NiCrAlY, however this description is merely exemplary and is not meant to limit the invention in any way.

The physical characteristics of the metallic material 26 facilitates its application on the screen 24. The metallic material 26 flows over and around the wires 30 to adhere to the wires 30. The metallic material 26 also possesses a viscosity that enables the. metallic material 26 to fill the openings 34 in the screen 24. Thus, the metallic material 26 comprises materials, such as but not limited to slurries and powders.

A slurry as a metallic material 26 that is applied to the screen 24 comprises a mixture of at least one oxidation resistant material, such as a metal powder, plus a binder. The mixture comprises about 70% by weight metal powder, and about 30% by weight of a binder. The binder is selected from appropriate binders for slurries, that are used to, hold powders and similar materials together.

One metal powder portion of a slurry mixture, as embodied by the invention, comprises about 90% of NiCrAlY (Ni-23Cr-6Al-0.4Y) by weight and about 10% of AlSi by weight. NiCrAlY is an oxidation-resistant composition possessing a high melting point (approximately 1350° C.). AlSi is an oxidation-resistant composition, and possesses a low melting point (approximately 577° C.). Therefore, if the bond coat is subjected to a heat treatment, AlSi melts prior to NiCrAlY melting, for example during subsequent heat treatments of the thermal barrier coating system 100. Melted AlSi fuses and re-acts together elements of the roughened bond coat. If the heat treatment is conducted at temperatures higher than the melting point of AlSi, but lower that the melting point of NiCrAlY, the AlSi melts before the NiCrAlY. The melted AlSi joins (fuses) the un-melted NiCrAlY and structural elements of the roughened bond together. NiCrAlY in the slurry mixture is merely exemplary of the metal powders within the scope of the invention, and other compositions, such as, but not limited to Ni-20Cr (melting point about 1400° C.) and Ni-60Al-1B (melting point about 850° C.), are within the scope of the invention. The combination of different melting point powders results in a higher density, for example a density of at least about 95% of its theoretical density.

Figure 5:
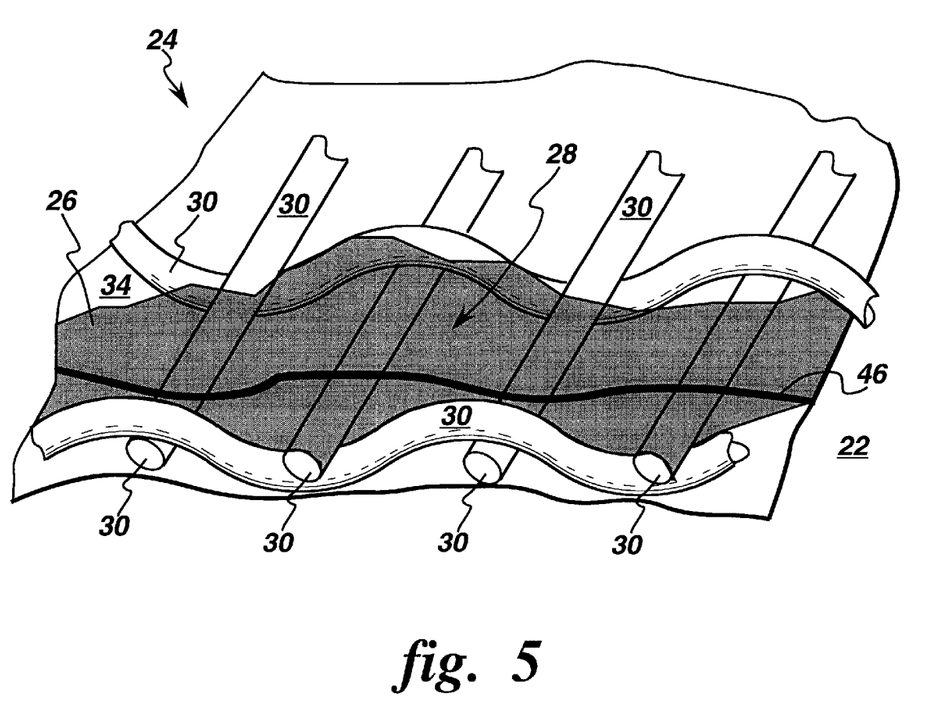
FIG. 5 is a side, part sectional illustration of a roughened bond coat.

FIG. 5 is a side part-sectional schematic illustration of a roughened bond coat 22 with the screen 24 having the metallic material 26 disposed thereto. As illustrated, a surface 46 of the metallic material 26 on the screen defines an interfacial surface area 28. The surface 46 is uneven, undulated, and irregular, rather than smooth as in known bond coat surfaces. Accordingly, the surface 46 provides a larger surface area compared to known smooth bond coat surfaces. For example, the interfacial surface area 28 is greater than a known bond coat's surface area by at least about 25%.

The roughness of the bond coat 24 is sufficient to increase interfacial surface areas at the interface, thus reducing de-bonding and increasing accommodation of thermal expansion mismatches. The bond coat 24, as embodied by the invention, possesses a roughness in a range of about 100 microinches (about $2.5 \times 10^{-4}$ cm) Ra (Arithmetic Average Roughness (Ra) as determined from ANSI/ASME Standard B461-1985) to about 2000 microinches (about $5.0 \times 10^{-3}$ cm) Ra. Alternatively, the bond coat 24 possesses a roughness in a range of about 100 microinches (about $2.5 \times 10^{-4}$ m) Ra to about 400 microinches (about $1.0 \times 10^{-3}$ cm) Ra. Further, the bond coat 24 possesses a roughness in a range of about 100 microinches (about $2.5 \times 10^{-4}$ cm) Ra to about 300 microinches (about $7.5 \times 10^{-4}$ cm) Ra.

Figure 6:
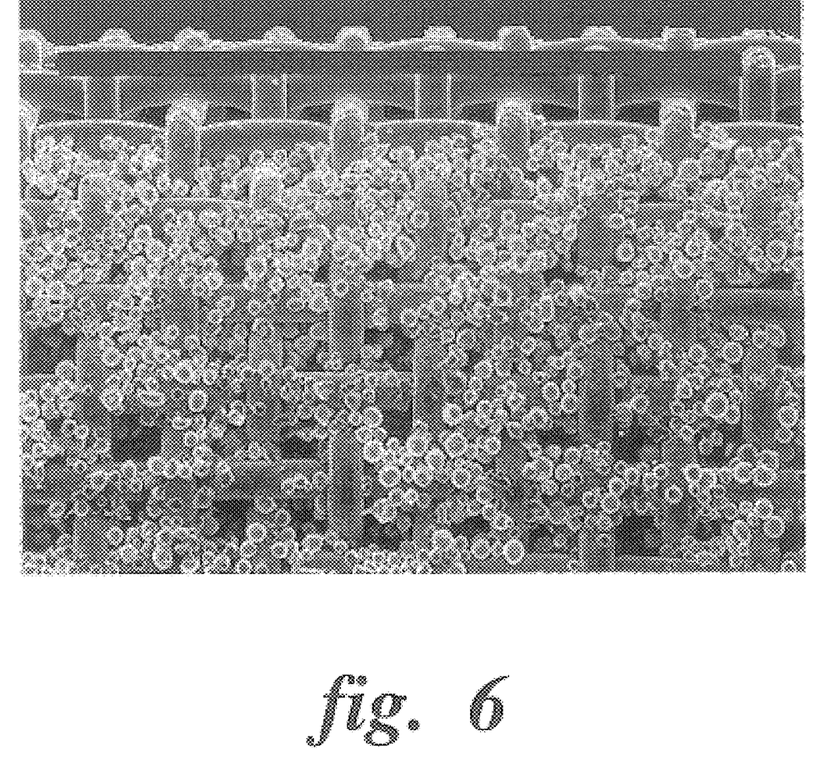
FIG. 6 is a micro-photograph of a roughened bond coat.

FIG. 6 is a micro-photograph of a roughened bond coat 22, where the metallic material 26 is applied as a slurry. In FIG. 6, some particles, such as NiCrAlY, that have a melting point higher that another component of the slurry, such as AlSi, of the metal powder portion of the slurry mixture remain un-melted after heat treatments (as discussed above). These un-melted powder particles sit on top of the screen and increase the localized roughness of the bond coat 22, which, of course, is desirable.

Melting of the AlSi enhances adherence the metal powder portion to the screen 24. A larger volume fraction of a low-melting point powder, such as AlSi, in the slurry mixture increases adhesion of the slurry to the screen 24. Further, a larger volume fraction of a low-melt powder, such as AlSi, decreases slurry porosity, as more material is melted and less gaps between powder particles remain. This reduced porosity enhances operation of the resultant thermal barrier coating system 100, as there are fewer gaps between powder particles for oxidation to initiate. Also, metallic material comprising AlSi may be applied to reduce porosity of the thermal barrier coating system at the screen, by applying AlSi to the screen 24 prior to applying the metallic material 26. Thus, the AlSi on the screen 24 will melt and reduce gaps at the screen 24, further reducing porosity.

The metal material 26, which is disposed on the screen 24, alternatively comprises a powder material. The powder material is disposed on the screen 24 by an appropriate powder spraying process, such as, but not limited to, plasma spraying, for example air-plasma spraying. Therefore, a roughened bond coat 22, as embodied by the invention, comprises a screen 24 with a powdered metallic material 26 applied thereto, for example by spraying. This process forms a metal material spray-formed overlayer, which comprises the powdered metallic material 26 on the screen 24.

The spray-formed overlayer is provided in a range from about $5 \times 10^{-3}$ cm to about $2.5 \times 10^{-2}$ cm. One exemplary overlay has an average thickness of about $1.27 \times 10^{-2}$ cm (0.005 inches). The powder for the metal material 26, in this embodiment of the invention, comprises at least one powder selected from: Al-11.6Si; NiCrAlY (Ni-23Cr-6Al-0.4Y); and a mixture of about 25% AlSi by weight and about 75% Ni-20Cr by weight. NiCrAlY is a known oxidation-resistant material. Thus, the mixture of AlSi and Ni-20Cr provides the metal material with desirable oxidation-resistant characteristics, especially after heat-treatment.

Figure 7:
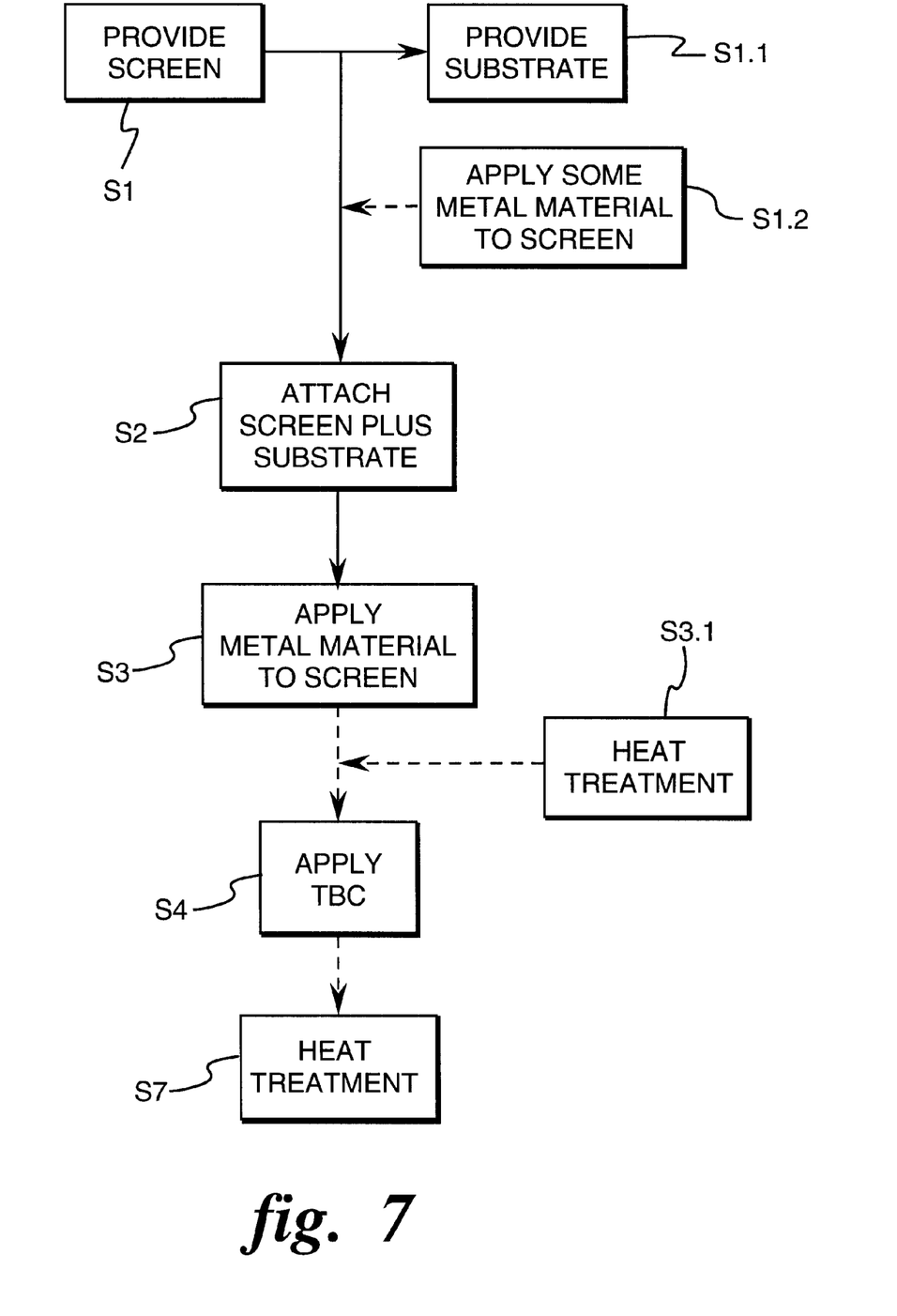
FIG. 7 is a flow chart of one method for forming a thermal barrier coating system.

FIG. 7 is a flow chart illustrating an exemplary process for preparing a roughened bond coat 22 and thermal barrier coating system 100, as embodied by the invention. In steps S1 and S1.1, a screen 24 and substrate 10, respectively, are provided. The screen 24 is attached to the substrate 10 in step S2. The screen 24 is attached to the substrate 10 at selected areas 110 (FIG. 2) by an appropriate method, for example welding, such as tack welding, ultrasonic welding, and laser welding.

Metallic material 26 is applied to the screen 24 in step S3. If the metallic material 26 is a slurry, it is applied to the screen 24 by a slurry liquid application process. If the metallic material 26 is provided as a powder, the metallic material 26 is sprayed onto the screen 24. Each of these processes results in a roughened bond coat 22 on a substrate 10.

Once the roughened bond coat 22 is provided, a TBC 14 is applied to the roughened bond coat 22 in step S4 to form a thermal barrier coating system 100. The TBC is disposed on the roughened bond coat 22 by an appropriate method, such as, but not limited to spraying, deposition, and coating.

The roughened bond coat 22 and substrate 10, prior to the TBC being disposed thereon, undergoes optional heat treatment, at step S3.1. Further, the entire thermal barrier coating system 100 undergoes optional heat treatment at step S7. The heat treatment of the thermal barrier coating system 100 comprises heat-treating at about 1200° C./1 hr in a vacuum and would generally be performed only if optional heat treatment step S3.1 is performed at a heat treatment temperature sufficient to melt the AlSi but not NiCrAlY or Ni-20Cr, if provided, wherein upon re-solidification the AlSi fuses the bond coat to the screen and its elements with the roughened bond coat 22.

As discussed above, some metallic material 26 can be applied to the screen 22 to reduce porosity of the roughened bond coat. The application of the metallic material 26 to the screen 22 occurs at step S1.2, which is prior to the attachment of the screen 22 to the substrate 10.

While various embodiments are described herein, it will be appreciated from the specification that various combinations of elements, variations or improvements therein may be made by those skilled in the art, and are within the scope of the invention.

What is claimed is:

1. A roughened bond coat comprising:
   a screen comprising interwoven wires defining openings; and
   a metallic material disposed on the screen, wherein the metallic material on the screen forms the uneven, undulated, and irregular surface, said metallic material comprising a combination of AlSi and a metallic alloy selected from the group consisting of (i) MCrAlY, (ii) NiCr, and (iii) Ni—Al—B, wherein M is at least one of nickel, iron, and cobalt.

2. A bond coat according to claim 1, wherein the openings comprise a size in a range from about 190 $\mu m^2$ to about 420 $\mu m^2$.

3. A bond coat according to claim 1, wherein the wires comprise a diameter in a range from about 50 $\mu m$ to about 240 $\mu m$.

4. A bond coat according to claim 3, wherein the openings comprise a size in a range from about 190 $\mu m^2$ to about 420 $\mu m^2$.

5. A bond coat according to claim 1, wherein the metallic material comprises a powder disposed on the screen.

6. A bond coat according to claim 5, wherein the powder comprises a layer of powder plasma sprayed on the screen.

7. A bond coat according to claim 6, said layer having a thickness in a range from about $5.0 \times 10^{-3}$ cm to about $12.5 \times 10^{-2}$ cm.

8. A bond coat according to claim 1, wherein the metallic material comprises a slurry disposed on the screen.

9. A bond coat according to claim 1, wherein the metallic material comprises at least one of a slurry and a powder, the metallic material comprises at least one of:
   MCrAlY, where M is at least one of nickel (Ni), iron (Fe), and cobalt (Co); Al-11.6Si; and Ni-20Cr.

10. A bond coat according to claim 9, wherein the metallic material comprises about 25% Al-11.6Si by weight and about 75% Ni-20Cr by weight.

11. A bond coat according to claim 1, wherein the metallic material comprises a slurry comprising about 70% by weight of a metal powder and about 30% by weight of a binder, and the metal powder comprises about 90% MCrAlY, where M is at least one of nickel (Ni), iron (Fe), and cobalt (Co), by weight and about 10% Al-11.6Si by weight.

12. The bond coat according to claim 1, wherein the bond coat is applied to a substrate comprising a turbine component.

13. A bond coat according to claim 1, wherein the disposing the metallic material forms the uneven, undulated, and irregular surface with roughness in a range from about $2.5 \times 10^{-4}$ cm Ra to about $5.0 \times 10^{-3}$ cm Ra.

14. A bond coat according to claim 1, wherein the disposing the metallic material forms the uneven, undulated, and irregular surface with roughness in a range from about $2.5 \times 10^{-4}$ cm Ra to about $10^{-3}$ cm Ra.

15. A bond coat according to claim 1, wherein the disposing the metallic material forms the uneven, undulated, and irregular surface with roughness in a range from about $2.5 \times 10^{-4}$ cm Ra to about $7.5 \times 10^{-4}$ cm Ra.

16. A thermal barrier coating system comprising:
   a roughened bond coat disposed on a substrate; and
   a thermal barrier coating disposed on the roughened bond coat, wherein the roughened bond coat comprises a screen comprising interwoven wires defining openings, and a metallic material disposed on the screen to form a roughened bond coat possessing an uneven, undulated, and irregular surface adjacent to the thermal barrier coating, wherein said metallic material comprises a combination of AlSi and a metallic alloy selected from the group consisting of (i) MCrAlY, (ii) NiCr, and (iii) Ni—Al—B, wherein M is at least one of nickel, iron, and cobalt.

17. A system according to claim 16, wherein the openings have a size in a range from about 190 $\mu m^2$ to about 420 $\mu m^2$.

18. A system according to claim 16, wherein the wires have a diameter in a range from about 50 $\mu m$ to about 240 $\mu m$.

19. A system according to claim 18, wherein the openings have a size in a range from about 190 $\mu m^2$ to about 420 $\mu m^2$.

20. A system according to claim 16, wherein the metallic material comprises a layer of metallic material that is plasma sprayed on the screen.

21. A system according to claim 20, wherein said layer comprises a layer with a thickness in a range from about $5.0 \times 10^{-3}$ cm to about $12.5 \times 10^{-2}$ cm.

22. A system according to claim 16, wherein said metallic material comprises a slurry disposed on the screen.

23. A system according to claim 16, wherein said metallic material comprises at least one of a slurry and a powder, the metallic material comprises at least one of:

MCrAlY, where M is at least one of nickel (Ni), iron (Fe), and cobalt (Co); Al-11.6Si; and Ni-20Cr.

24. A system according to claim 23, wherein the metallic material comprises about 25% Al-11.6Si by weight and about 75% Ni-20Cr by weight.

25. A system according to claim 16, wherein the metallic material comprises a slurry comprising about 70% by weight of a metal powder and about 30% by weight of a binder and the metal powder comprises about 90% MCrAlY, where M is at least one of nickel (Ni), iron (Fe), and cobalt (Co), by weight and about 10% Al-11.6Si by weight.

26. A system according to claim 16, wherein the system undergoes heat treatment and a portion of the metallic material melts and re-solidifies joining the roughned bond coat to the substrate.

27. A system according to claim 16, the system further comprises connections that connect the screen to the substrate.

28. A system according to claim 27, wherein said connections comprise welds.

29. A system according to claim 16, wherein the substrate comprises a turbine component.

30. A system according to claim 16, wherein the disposing the metallic material forms the uneven, undulated, and irregular surface with roughness in a range from about $2.5 \times 10^{-4}$ cm Ra to about $5.0 \times 10^{-3}$ cm Ra.

31. A system according to claim 16, wherein the disposing the metallic material forms the uneven, undulated, and irregular surface with roughness in a range from about $2.5 \times 10^{-4}$ cm Ra to about $10^{-3}$ cm Ra.

32. A system according to claim 16, wherein the disposing the metallic material forms the uneven, undulated, and irregular surface with roughness in a range from about $2.5 \times 10^{-4}$ cm Ra to about $7.5 \times 10^{-4}$ cm Ra.

* * * * *